Dec. 26, 1950 R. L. HOOVER 2,535,208
MOMENT OF INERTIA CALCULATING DEVICE
Filed Dec. 17, 1949 3 Sheets-Sheet 1

Inventor
Richard L. Hoover
by
Bean, Brooks, Buckley & Bean
Attorneys

Dec. 26, 1950 R. L. HOOVER 2,535,208
MOMENT OF INERTIA CALCULATING DEVICE
Filed Dec. 17, 1949 3 Sheets-Sheet 2

Inventor
Richard L. Hoover
by
Bean, Brooks, Buckley & Bean
Attorneys

Dec. 26, 1950  R. L. HOOVER  2,535,208
MOMENT OF INERTIA CALCULATING DEVICE
Filed Dec. 17, 1949  3 Sheets-Sheet 3

Inventor.
Richard L. Hoover
by
Bean, Brooks, Buckley & Bean.
Attorneys

Patented Dec. 26, 1950

2,535,208

UNITED STATES PATENT OFFICE 2,535,208

MOMENT OF INERTIA CALCULATING DEVICE

Richard L. Hoover, Buffalo, N. Y.

Application December 17, 1949, Serial No. 133,549

10 Claims. (Cl. 35—19)

This invention relates to novel apparatus for use in determining the moments of inertia of areas with repect to given axes.

As is well known, the moment of inertia of a given area with respect to a certain neutral axis or axis of rotation is the integral sum of the products arrived at by multiplying each infinitely small increment of area in the cross section by the square of its distance from the axis of reference. Simple algebraic formulae have been derived for computing the moments of inertia of common geometric figures such as squares, rectangles and circles. However, in actual practice very few problems fall in this limited category and it is necessary to perform intricate and long drawn out mathematical computations to arrive at even an approximation of the moment of inertia of an irregular area. In aeronautical engineering, for instance, the moments of inertia of air foils and similar cross sections are constantly in question and literally thousands of man hours are expended in these computations. Furthermore, these computations require a high degree of mathematical skill.

In the prior art several fully mechanical integrating machines have been proposed for this purpose but thus far none has amounted to a practical solution to the problem presented by this vast expenditure of energy and the great economic waste incident thereto. As now carried on, the necessary length and extent of the necessary mathematical computation introduces a large degree of probable error and necessitates a great deal of checking and rechecking of computations to insure a proper degree of accuracy.

My invention provides a simple mechanical device whereby the user may simply draw the cross section of the area in question in proper relation with respect to a given neutral axis, then, by a momentary manipulation which is simplicity itself, transform that area into another area which is equal in magnitude to the moment of inertia of the initial cross sectional area with respect to the assumed axis. At this point any of the various known forms of planimeters which are available may be employed for arriving at the numerical value of the area thus graphically represented, such numerical value being the moment of inertia of the initial area, with respect to the assumed neutral axis.

In addition to the tremendous saving in time thus afforded in actual industrial or scientific pursuits where frequent moment of inertia computations are encountered, the device of the present invention is of great value and usefulness in educational work. It presents the moment of inertia graphically in such a way that its relation to the initial area of which the moment of inertia is being calculated can be clearly seen and this enables the student to readily grasp this relationship.

A further advantage of importance which attends the use of the device of the present invention is the fact that, in industrial and scientific establishments, moments of inertia may be determined by relatively lower priced clerical personnel, rather than by the scarce and costly engineering and mathematical personnel now required.

The accompanying drawing and the following detailed description illustrate, by way of example, one practical embodiment of the principles of my invention. It is to be understood, however, that various mechanical modifications and refinements may be introduced without departing from the spirit of the present invention, the scope of which is limited only as defined in the appended claims.

Figure 1:
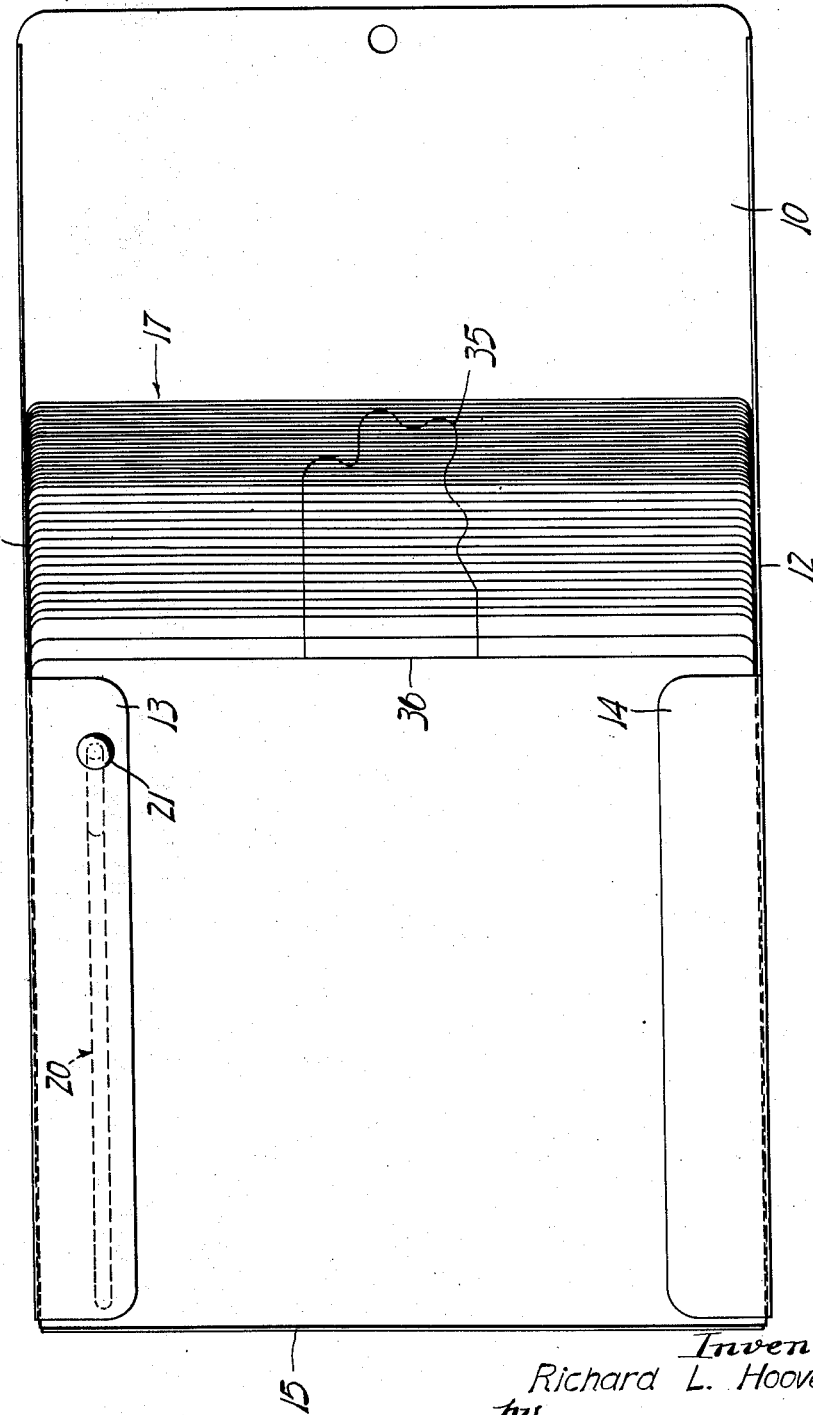
Fig. 1 is a face view of one form of the device of the present invention with the parts in their initial position.

It is well known that the moment of inertia of a rectangle about its base as a neutral axis is $$\frac{bd^3}{3}$$

where $b$ is the width of the rectangle and $d$ is its depth or height. Since the operation of the device of the present invention leaves the widths of areas unaffected we are concerned only with altering their height or depth in each instance by calculating or graphically determining the numerical value of $$\frac{d^3}{3}$$

In effect, the present device divides a given cross sectional area into a considerable number of elemental rectangles, each extending the full width of the area at any given point, then automatically expands or contracts the elemental areas according to the above formula. It will be observed that representing the moment of inertia as an area in this manner involves reducing the area of some of the elemental rectangles close to the axis of rotation and increasing the areas of others farther out.

The moment of inertia of any given elemental rectangle at a distance $r$ from the axis of rotation is determined by multiplying the area by $r^2$. Accordingly an increment of area A at a mean distance one inch from the axis of rotation will have a moment of inertia equal to A. All elemental rectangles closer to the neutral axis must be diminished in size to graphically represent the neutral axis and all those farther away must be expanded for this purpose.

For convenience of operation it is desired to shift all of the sheets in the same direction in moving them to points where they cooperate, to represent the moment of inertia as an area, accordingly the sheet at one inch from the neutral axis or the sheets closest thereto will have a minimum of shifting movement. The theoretical operation of the present device will be better understood from a consideration of the exemplary form illustrated in the accompanying drawings. The elemental rectangles into which the area is divided need not be equal and in fact more practical operation and accuracy is attained by using smaller elemental rectangle where the ultimate expansion and accordingly the weight in the ultimate result is greatest.

In the several figures of the drawing like characters of reference denote like parts and the numeral 10 designates a backing sheet which is preferably stiff enough to form a self-sustaining writing pad but need not necessarily be so. In the preferred form shown herein by way of example backing sheet 10 is of light sheet metal and has upwardly extending side flanges 11 and 12 which terminate at their upper edges in inwardly directed flanges 13 and 14. Sheet 10 is further provided with an upwardly directed flange 15 at its lower edge.

A number of superposed sheets of paper or the like, designated collectively 17, lie upon backing sheet 10, being retained by the overlying flanges 13 and 14 and being restrained against sidewise displacement by flanges 11 and 12. In the position shown in Fig. 1 the several sheets 17 rest at their lower edges against bottom flange 15 and are thus held in their predetermined starting position.

In the form shown in Fig. 1 by way of example the pad or stack 17 comprises thirty-eight sheets. Referring to the upper edges of the sheets 17, they are arranged to form, beginning at the bottom of the series, two quarter inch spaces, fifteen one-tenth inch spaces, and twenty one-twentieth inch spaces, for a total height of three inches.

It will be noted that the eighth sheet in the pad will lie with its upper edge one inch above the upper edge of the first sheet of the pad. Therefore a minute increment of area lying along that line will be equal to its moment of inertia since multiplying such area by the square of its distance from the axis of rotation will merely multiply it by one. Accordingly the rectangles formed by seventh and eighth sheets and the eighth and ninth sheets will have a minimum of change in size, the former decreasing slightly and the latter increasing slightly so that their combined area remains unchanged because their joint moment of inertia with respect to an axis of rotation represented by the upper edge of the first sheet of the pad or stack 17 is numerically equal to their joint area.

Figure 4:
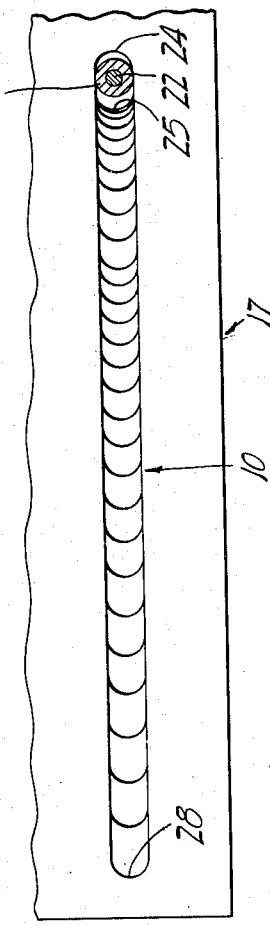
Fig. 4 is a fragmentary view similar to Fig. 3 but showing the reverse side of the stack or pad of sheets.
Figure 3:
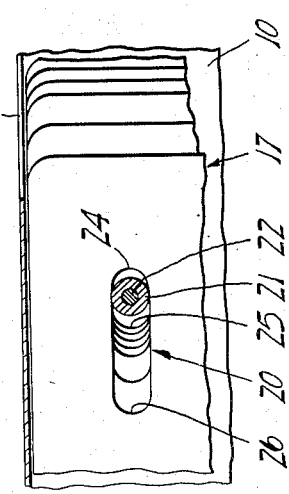
Fig. 3 is a fragmentary view taken similarly to Fig. 1 but with the left side flange of the holder broken way for added illustration.

The several sheets have aligned slots designated generally 20 in Figs. 1, 3 and 4 and a retaining and gauging device in the form of a headed pin 21 passes through the slots and through openings in the body of backing sheet 10 and flange 13. Pin 21 may be internally threaded to receive a headed screw 22 to provide for ready removal and replacement of sheets 17 when desired.

In the form shown by way of example all of the slots 20 have coterminous upper edges as at 24 in Figs. 3 and 4, merely for mechanical clearance and manufacturing tolerance since the sheets are properly located by engagement of their lower edges against bottom flange 15.

The lower end of the slot in the eighth sheet from the top of pad 17 is shown at 25 in Figs. 3 and 4 and the distance from this end to pin 25 is arbitrary and merely for clearance. The lower end of the slot in the first sheet of the pad is shown at 26 in Fig. 3 and is .667 inch below the lower end 25 of the notch in the eighth sheet. Thus when both sheets one and eight are moved outwardly until ends 25 and 26 of their notches engage pin 21 their upper edges are moved from their original one inch spacing to a spacing of one third of an inch.

Fig. 4 is looking at the bottom of the pad and the numeral 28 designates the lower end of the notch in the bottom sheet of the pad. The upper edge of this sheet is initially three inches from the top sheet, and since $$\frac{d^3}{3} \text{ equals } 9$$

the final position of this bottom sheet must be 9″ from the upper edge of the first sheet, with the latter comprising the axis of rotation and the area between representing the numerical value of the moment of inertia. Since the top sheet itself moves outwardly .667 inch and the initial spacing of the top and bottom sheets is three inches, the distance from the lower end 28 in the bottom sheet to the lower end 25 of the slot in sheet number eight must be 6.667 inches.

The two foregoing computations are set forth merely by way of example and the governing principles and the determination of the location of the various intermediate slot ends will be readily accomplished by those skilled in the art.

Figure 2:
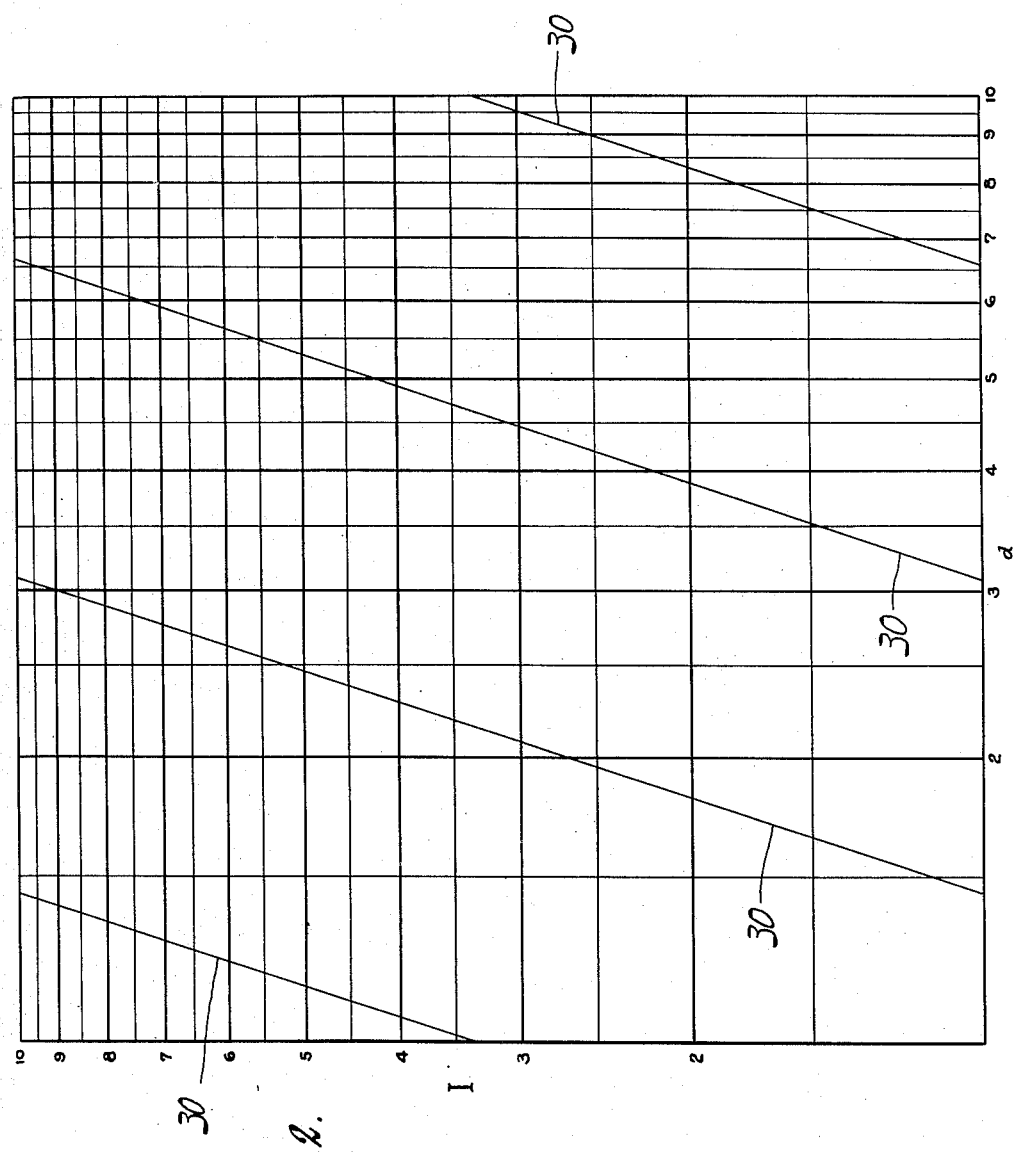
Fig. 2 is a graph from which the moments of inertia of rectangles of various depths may be directly read.

Fig. 2 is a graph ruled logarithmically as to both its ordinate and its abscissa and the numeral 30 designates a recurring one to three slope line. Thus the moment of inertia of any rectangle of unit width and of any height $d$, with respect to its base as an axis of rotation, may be read directly at the intersection of slope line 30 with the vertical line at the ordinate distance corresponding to the height $d$.

Figure 5:
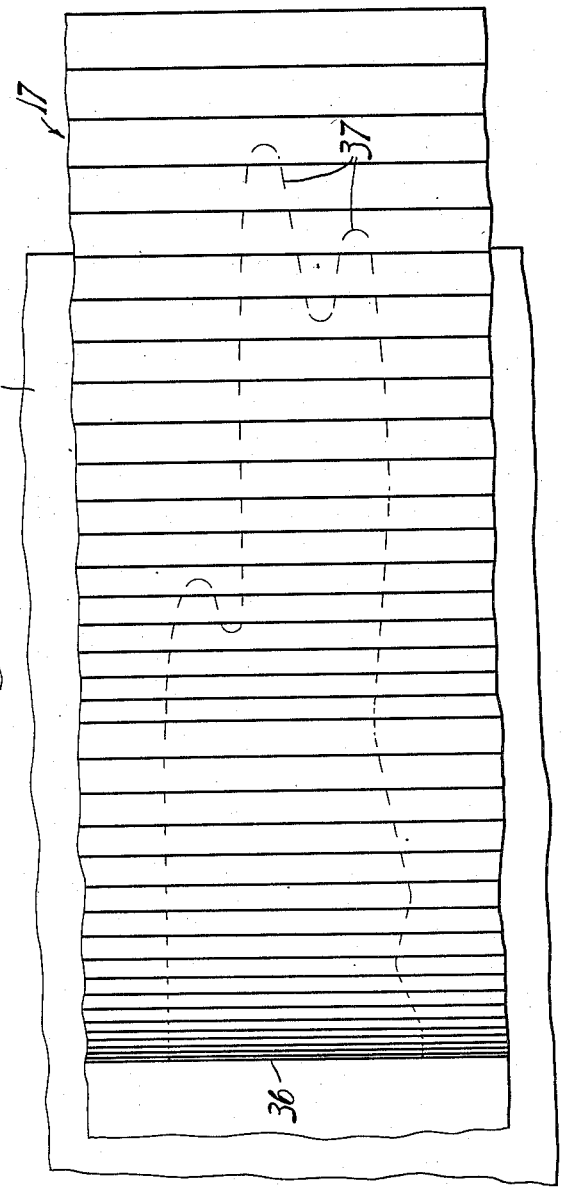
Fig. 5 is a fragmentary view showing the final position of the sheets in which the moment of inertia of a given area is graphically depicted as an area which may readily be measured by well known devices.

In Fig. 1 an irregular area has been drawn at 35 upon a base 36 which is the assumed axis of rotation and is coincident with the upper edge of the top sheet of the pad or stack 17. After drawing this figure, the pad merely is held upside down and the sheets fall downwardly until the lower ends of all of the slots 20 engage pin 21 and the upper edges of the sheets assume the general relationship illustrated in Fig. 5.

The broken lines 37 which remain after this shifting movement of the sheets define an area numerically equal to the moment of inertia of the area 35 about base 36 and the area enclosed by broken lines 37 may readily be determined by use of any of the well known forms of planimeter.

In Fig. 1 the area outline 35 is based on the neutral axis at the top edge of the top sheet, as at 36. However where the area dealt with is spaced from the neutral axis at 36 it is merely drawn on the overlapping sheets at the proper distance from the top edge of the top sheet. Also, when the desired neutral axis extends through the figure to be calculated it may be divided along the neutral axis and each of the two parts may then be reckoned separately, as at 36 in Fig. 1, and the results may be merely added to give the moment of inertia of the entire figure about the desired neutral axis through the figure.

Where the moments of inertia of large areas are to be computed this may be done by drawing the area to a reduced scale and then the planimeter reading must be multiplied by the reciprocal of the scale of reduction raised to the fourth power. For instance, if the area is drawn one half size, the planimeter reading must be multiplied by two to the fourth power, or 16, to give the correct moment of inertia.

The use of the upper edge of the top sheet as the axis of rotation of the area has been for convenience and by way of example. The principles of the present invention do not require this, and other sheet edges or other lines may be used as a neutral axis or axis of rotation by making proper adjustments in the extents of the slots or other gauging points. Similarly, reference herein to slots is by way of example only and the use of notches, tabs or other gauging formations on the sheets may be resorted to without changing the basic mode of operation.

A given pad or stack of sheets may be used repeatedly by using different lateral portions, by erasing previous figures, by superposing different figures in contrasting colors, or otherwise. Also, the sheets may be of a special material which permits figures drawn thereon to be readily washed or wiped therefrom when a computation has been completed.

What is claimed is:

1. Means for graphically producing the moments of inertia of areas comprising a stack of sheets and means initially positioning the sheets so that one edge of each projects beyond the corresponding edge of the sheet above a predetermined distance, one of said sheet edges comprising an axis of reference, gauge formations on said sheets, and means engageable by said gauge formations upon movement of the sheets away from their initial positions to vary the distance of each sheet edge from the axis of reference according to the formula $$d' = \frac{d^3}{3}$$

where $d$ is the initial perpendicular distance of a sheet edge from the axis of reference and $d'$ is the distance after shifting.

2. Means for graphically producing the moments of inertia of areas comprising a stack of sheets and means initially positioning the sheets so that they are stepped at one edge so that each sheet projects beyond the edge of the sheet above whereby each two adjacent sheet edges and the sides of the lower sheet form a relatively narrow rectangle, one of said sheet edges comprising an axis of reference, gauge formations on said sheets, and means cooperating with said gauge formations upon shifting of the sheets from their initial positions to vary the distances between adjacent sheet edges so that the area of each corresponding rectangle so formed is varied to correspond to its initial area multiplied by the square of its mean distance from the axis of reference.

3. Means for graphically producing the moments of inertia of areas comprising a plurality of sheets superposed with one edge of each sheet initially projecting beyond the sheet above whereby the sheet edges form a series of coordinates at predetermined distances from an assumed axis of rotation, gauge formations on said sheets, and means cooperating with said gauge formations upon shifting of the sheets from their initial positions to such positions that the distance between adjacent coordinates is varied to correspond to the product of the distance between the initial spacing of the sheet edges multiplied by the square of the mean distance of the said two sheet edges from the axis of rotation.

4. Means for graphically producing the moments of inertia of areas comprising a holder, a plurality of superposed sheets mounted on said holder for lineal sliding movement longitudinally of the holder, stop means on said sheets and cooperating stop means on said holder for limiting the sliding movement of the sheets in either direction, said sheets when in one limit position being proportioned to expose a relatively narrow transverse edge portion thereof of predetermined width beyond the corresponding edge of the sheet above, said sheets when in their other limit position being located so that the width of each exposed edge portion is varied to equal the product of said predetermined initial width multiplied by the square of its mean distance from a predetermined axis of rotation.

5. Means for graphically producing the moments of inertia of areas comprising a stack of sheets and means initially positioning the sheets so that one edge of each projects beyond the corresponding edge of the sheet above a predetermined distance, gauge formations on said sheets, and means engageable by said gauge formations upon movement of the sheets away from their initial positions to vary the distance of each sheet edge from a predetermined axis of reference according to the formula $$d' = \frac{d^3}{3}$$

where $d$ is the initial perpendicular distance of a sheet edge from the axis of reference and $d'$ is the distance after shifting.

6. Means for graphically producing the moments of inertia of areas comprising a holder, a plurality of superposed sheets mounted on said holder for lineal sliding movement longitudinally of the holder, stop means on said sheets and cooperating stop means on said holder for limiting the sliding movement of the sheets in either direction, the stop means on said sheets when in one limit position being proportioned so that one transverse edge of each projects beyond the corresponding edge of the sheet above a predetermined distance, one of said sheet edges comprising an axis of reference, and the stop means on said sheets when in their other limit position being located so as to vary the distance of each sheet edge from the axis of reference according to the formula $$d' = \frac{d^3}{3}$$

where $d$ is the initial perpendicular distance of a sheet edge from the axis of reference and $d'$ is the distance after shifting.

7. Means for graphically producing the moments of inertia of areas comprising a holder, a plurality of superposed sheets mounted on said holder for lineal sliding movement longitudinally of the holder, stop means on said sheets and cooperating stop means on said holder for limiting the sliding movement of the sheets in either direction, the stop means on said sheets when in one limit position being proportioned so that one transverse edge of each projects beyond the corresponding edge of the sheet above a predetermined distance, the stop means on said sheets when in their other limit position being located so as to vary the distance of each sheet edge from a predetermined axis of reference according to the formula $$d' = \frac{d^3}{3}$$

where $d$ is the initial perpendicular distance of a sheet edge from the axis of reference and $d'$ is the distance after shifting.

8. Means for graphically producing the moments of inertia of areas comprising a holder, a plurality of superposed sheets mounted on said holder for lineal movement longitudinally of the holder, stop means on said sheets and cooperating stop means on said holder for limiting said lineal movement in both directions, the stop means on said sheets when in one limit position being proportioned to expose a relatively narrow rectangle of predetermined area at a transverse edge of each sheet beyond the corresponding edge of the sheet above, and the stop means on said sheets when in their other limit position being so located that the area of each of said rectangles is varied to correspond to its initially predetermined area multiplied by the square of its mean distance from an assumed axis of reference.

9. Means for graphically producing the moments of inertia of areas comprising a holder, a plurality of superposed sheets mounted on said holder for lineal movement longitudinally of the holder, and stop means on said holder and variously located gauging formations on said sheets limiting said lineal movement in both directions, the stop means on said holder being located so that when said sheets are in one limit position a relatively narrow rectangle at the transverse edge of each sheet of predetermined longitudinal extent is exposed beyond the corresponding edge of the sheet above and when said sheets are in their other limit position each predetermined longitudinal extent is varied by such amount that the area of each of said rectangles is varied to correspond to its initial area multiplied by the square of its mean distance from an assumed axis of reference.

10. Means for graphically producing the moments of inertia of areas comprising a holder, a plurality of superposed sheets mounted on said holder for guided lineal movement longitudinally of the holder, said sheets having a predetermined initial position wherein a relatively narrow transverse edge portion thereof of predetermined longitudinal extent projects beyond the corresponding edge of the sheet above, a stop on said holder and elongate graduated recesses formed in said sheets to provide gauging edges for engagement with said stop means, said recesses being so proportioned that when said sheets are moved to dispose said gauging edges against the stop on said holder the sheets are relatively shifted longitudinally so that the longitudinal extent of each projecting edge portion is adjusted to equal the predetermined initial extent of exposure multiplied by the square of its mean distance from an assumed axis of rotation.

RICHARD L. HOOVER.

REFERENCES CITED

The following references are of record in the file of this patent:

UNITED STATES PATENTS

| Number | Name | Date |
|---|---|---|
| 2,332,832 | Staff et al. | Oct. 26, 1943 |